United States Patent [19]
Gauthier et al.

[11] Patent Number: 5,228,042
[45] Date of Patent: Jul. 13, 1993

[54] METHOD AND CIRCUIT FOR TESTING TRANSMISSION PATHS

[75] Inventors: John A. Gauthier, Kanata; John K. Goatcher, Nepean, both of Canada

[73] Assignee: Northern Telecom Limited, Montreal, Canada

[21] Appl. No.: 651,835

[22] Filed: Feb. 7, 1991

[51] Int. Cl.$^5$ .............................................. G01R 31/28
[52] U.S. Cl. ...................................... 371/20.5; 371/24; 371/25.1
[58] Field of Search ................... 371/20.4, 20.5, 21.2, 371/22.3, 24, 28.1, 27, 67.1, 68.2

[56] References Cited

U.S. PATENT DOCUMENTS 4,827,476  5/1989  Garcia ................................ 371/22.3
5,001,713  3/1991  Whetsel ............................. 371/22.3

Primary Examiner—Vincent P. Canney
Attorney, Agent, or Firm—F. P. Turpin

[57] ABSTRACT

A circuit for testing the integrity of transmission paths includes a first linear feedback shift register (LFSR) adapted to generate a periodic sequence of pseudo random test data for transmission on the transmission paths. A second LFSR synchronizes to the transmitted test data after being provided with a seed value corresponding to a transmitted data word. After synchronization, the second LFSR is set to a free running mode and independently generates a pseudo random sequence of patterns corresponding to the sequence generated by the first LFSR. A comparator compares the pseudo random data generated by the second LFSR with the pseudo random data received from the transmission paths. If a mismatch occurs a signal indicating an error condition is asserted.

15 Claims, 2 Drawing Sheets

METHOD AND CIRCUIT FOR TESTING TRANSMISSION PATHS

FIELD OF THE INVENTION

The invention relates to a circuit and method of testing and more specifically to a method and circuit for generating pseudo random test data for verifying the integrity of transmission paths.

BACKGROUND OF THE INVENTION

In the past, the integrity of transmission paths has usually been verified using a signature test. A signature comprised of a predetermined pattern of data bits is transmitted through a transmission path under test and is compared to the data received at a receiver. The transmission path under test is considered to be fault-free if the received data matches the transmitted data.

More recently, transmission circuits have become increasingly more complex with a requirement for data to be transmitted at higher rates. As bit rates increase, the need for the testing of transmission circuits becomes more essential since a transmission circuit which performs adequately at low frequencies may not perform adequately at much higher frequencies and may cause data to become corrupt. Transmission circuits capable of transmitting data at high frequencies often have many closely inter-spaced data lines forming a data bus. It is not uncommon for noise to be generated on the bus as data bits carried on the data bus are changing binary values at very high frequencies. This noise is often the cause of data corruption, resulting in the loss of integrity of a transmitted data message. A static data test such as a signature test may not detect data corruption in a circuit capable of transmitting large amounts of data at very high frequencies. Thus, it is desirable to provide test data which is random or pseudo random and which covers a myriad of possible bit combinations thereby to provide varying stimuli for a transmission circuit under test. Pseudo random data is comprised of many varying patterns which, while appearing random, are periodically based.

In the past, large memory devices have been used to store test data; however, memory devices capable of storing an adequate amount of test data are physically large and may not be practically incorporated on an integrated circuit that also includes the circuit under test.

It is therefore an object of the invention to provide an improved method and circuit for testing the integrity of a transmission path.

It is also an object of the invention to provide testing circuitry that may be co-located on an integrated circuit also containing at least a portion of the circuit to be tested.

It is a further object of the invention to provide testing circuitry that is adapted to exercise the circuit under test at a data rate similar to that normally sent through the circuit under test.

SUMMARY OF THE INVENTION

The circuit of the invention is particularly well-suited to test the integrity of transmission paths such as exist through a switching network module. A circuit adapted to generate pseudo random data may be connected to apply the generated data to the input ports of the module whereas another circuit is responsive to the data at the output ports of the module for synchronizing to the generated data thereby allowing a continuous comparison between the generated data and the data at the output ports of the module. A mismatch of the compared data indicates a problem associated with the particular transmission path being tested.

In accordance with the invention there is provided a method of testing a circuit comprising a plurality of transmission paths having x input terminals for receiving series of input test patterns and having corresponding y output terminals, the method comprising the steps of:

in a first generator for connection to the input terminals, generating a first series of $2^n$ pseudo random test patterns, each pattern having n bits;

applying to the x input terminals at least a portion of each of the generated first series of patterns for transmission to the corresponding y output terminals;

in a second pseudo random test pattern generator at the output of the circuit, generating a second series of patterns by beginning the second series with an n bit seed value corresponding to the nth test pattern generated by the first generator whereby the test patterns subsequently generated by the second generator correspond to the pseudo random test patterns generated by the first generator and are in synchronism with the test patterns on the output terminals; and comparing each of the test patterns on the output terminals of the circuit with the corresponding test pattern from the second generator and generating a signal in the event of a mismatch.

From a different aspect, the invention also provides a circuit for testing transmission paths. The circuit comprises means for generating a first periodic series of $2^n$ pseudo random test input patterns, each pattern having n-bits for transmission through the transmission paths; means for generating a second periodic series of $2^n$ patterns, the second series corresponding to the first generated series, wherein the second series is generated after the second series generation means is provided with an n-bit starting seed value corresponding to an output pattern transmitted through the transmission paths; the provision of the seed value corresponding to a synchronizing mode; the subsequent generation of the second series corresponding to a free-running mode; control means for selectively switching the means for generating the second series from the synchronizing mode to the free running mode; and comparator means for comparing each pattern in the second series with a corresponding output pattern from a series of output patterns transmitted through the transmission paths for determining the integrity of a data transmission.

The invention thus provides a simple and economical circuit and method of testing the integrity of a transmission path under conditions approximating normal operating conditions. Furthermore, the circuit of the invention may be practically implemented as an integrated circuit either by itself or with other circuitry such as a plurality of transmission paths that may periodically require to be exercised. To that end, the circuit of the invention may also comprise circuit means for switchably coupling it to transmission paths under control signals such as from a processor.

DETAILED DESCRIPTION

Figure 1:
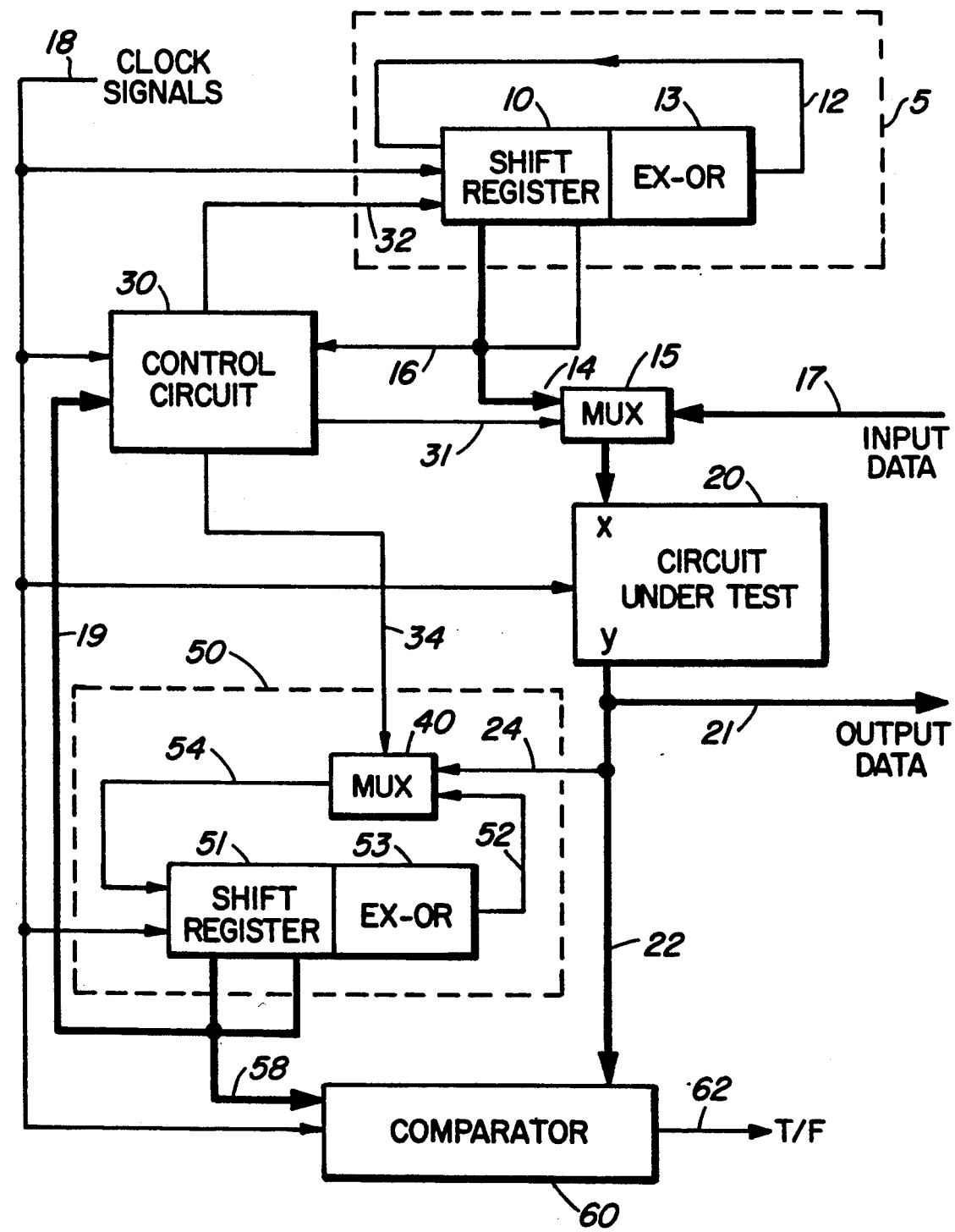
Figure 2:
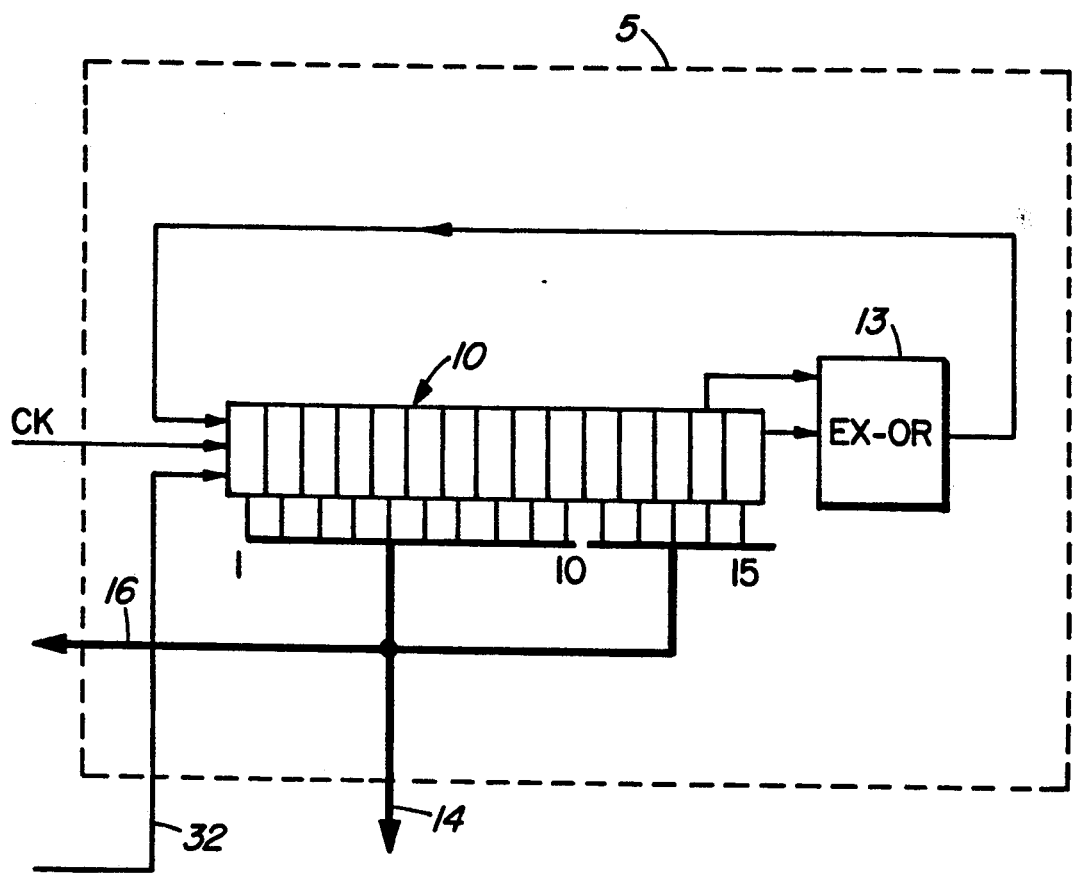

An embodiment of the invention will be described with reference to the drawings in which:

FIG. 1 is a block diagram of a test circuit in accordance with the invention; and FIG. 2 is a schematic block diagram of a portion of the test circuit shown in FIG. 1.

In FIGS. 1 and 2, a linear feedback shift register (LFSR) 5 for generating pseudo random test data is shown comprising a conventional shift register 10 coupled to an exclusive-or gate 13. A multiplexer circuit 15 is adapted to selectively connect the input ports of a circuit under test 20 via a data bus 14 or to a data input bus 17 under control of signals 31 from control circuit 30. In more detail, FIG. 2 shows the LFSR 5 comprised of a 15-bit shift register 10 and an exclusive-or gate 13. The first 10 stages of the 15-bit shift register correspond to bit positions 1 to 10 and provide a 10 bit parallel output stream of pseudo random test data on data bus 14. The exclusive-or gate 13 is connected to receive the values stored in two locations (e.g., 14th and 15th bit positions) of the 15-bit shift register and generates an exclusive-or feedback signal which is transmitted on feedback path 12 to the input stage of the shift register 10. The circuit under test 20 receives the test patterns from the LFSR 5 and provides the test patterns on bus 22. As mentioned above, the circuit of the invention is particularly well suited to the testing of a circuit such as a switching network which of course comprises a plurality of transmission paths. The multiplexer 15 is thus arranged to switchably connect the test signals from the LFSR 5 or the normal input data on bus 17 to the various input ports of the switching network. Data bus 21 connected to bus 22 provides output data to other circuitry connected to the circuit under test 20. The data transmitted on data bus 21 is either normal input data which originated on data bus 17 or the input test data originating from the LFSR 5.

A second LFSR circuit 50 is configured in a similar manner as the first; however, a multiplexer 40 permits one of two signals to be fed back to the input stage of a shift register 51. An exclusive-or gate 53 is responsive to the two most significant bits of the shift register 51, (e.g., bits 14 and 15), to generate an exclusive-or feedback signal which is transmitted on feedback path 52 to the multiplexer 40 which is also connected to data line 24 to receive a signal carried on the least significant data line of data bus 22. The control circuit 30 provides a selection control signal on control line 34 for selecting the signal carried on data line 24 or the feedback signal carried on feedback path 52. The least significant data line on data bus 22 is connected to data line 24 to permit a portion of the pseudo random data transmitted in the least significant bit position to be transmitted to the second LFSR 50 via the multiplexer 40. The control circuit also monitors the value stored in the LFSR 5 and the LFSR 50 via control lines 16 and 19 respectively.

A comparator 60 is connected to receive the 10-bit series of output test patterns from the circuit 20 and a 10-bit pattern generated by the second LFSR circuit 50 on data bus 58. The comparator 60 compares the two 10-bit series of test patterns and generates true or false signals. A clock signal provided on control line 18 provides a timing signal to the first LFSR 5, the control circuit 30, the second LFSR circuit 50 and to the comparator 60. If that clock signal has the same frequency as that normally driving the circuit under test 20, then the circuit is exercised under real-life conditions.

In operation, the LFSR 5 is adapted to generate pseudo random binary test data for provision to the circuit under test 20. After a sequence of $2^{15}-1$ patterns have been generated by the LFSR 5 the sequence of patterns repeats.

Upon power up of the test circuitry, the control circuit 30 initializes the 15bit binary value stored in the LFSR 5 to a non-zero value to prevent the LFSR 5 from generating only zero-bit patterns. After initialization, the control circuit 30 continues to monitor the contents of the first and second LFSRs 5 and 50 to ensure that they do not remain in a state where either one of them contains all zero bits. If an all zero state is detected in the LFSR 5 or the LFSR 50, the control circuit 30 re-initializes the test circuit by asserting the signals on control lines 32 and 34.

Once the LFSR 5 has been initialized, the binary word stored in the 15bit shift register 10 is shifted in the more significant direction in a rotational manner; the bit stored in the first stage of the shift register 10 is shifted to the second stage; the bit stored in the second stage is simultaneously shifted to the third stage, and so on. Each shift occurs synchronously with each period of the clock signal. As each shift occurs, the bits stored in the two most significant bit positions, bits 14 and 15 are exclusive-ored and the resultant signal is fed back to the least significant bit position of the shift register 10. Feeding back the resultant signal ensures that, with each period of the clock signal, the binary value of the 15-bit binary word in the LFSR 5 changes with each shift. The least significant 10 bits of the 15bit binary word corresponding to the first 10 stages of the shift register, form a binary pattern and with each shift, a different pattern is formed. Of course, the entire 15 bits could be used to form test patterns, however, in the embodiment described only the least 10 significant bits are required. Providing an LFSR which has more register stages than the bits used for the test patterns as exemplified in the embodiment, provides more patterns in the series of test patterns and thus provides a greater variation of stimuli presented to the circuit under test. The series of pseudo random binary data patterns are transmitted to the circuit under test 20 via data bus 14 and multiplexer 15.

After a transmission delay in the circuit under test 20, the comparator 60 is presented with the first pattern via data bus 22. During the initialization stage, the selection control signal is asserted on control line 34 to select a least significant bit of the series of patterns transmitted on data bus 22 to provide an input signal to the second LFSR circuit 50. After 15 clock cycles have occurred, a 15bit word corresponding to a word that was generated in the first LFSR 5 will have been written into the second LFSR circuit 50. By copying 15 successive values from the least significant data line of data bus 22, and shifting the 15 bits into the second LFSR 50, a 15-bit word is captured which was generated sometime before in the first LFSR 5. The 15-bit binary word in the LFSR 50 represents a seed value from which it may generate data patterns on its own in a free running mode. The control circuit 30 thus de-asserts the selection control signal on control line 34 and the multiplexer 40 provides the input stage of the second LFSR 50 with the exclusive-or feedback signal carried on feedback path 52. With each successive period of the clock signal, a 10-bit binary word corresponding to the least significant 10-bits of the second LFSR 50 are presented to the comparator 60. Each 10-bit binary word presented to the comparator 60 on data bus 58 should henceforth match a pattern of the series of patterns received on data bus 22. A mismatch between the two 10-bit binary words presented to the comparator 60 results in the comparator generating a false condition signal on an output line 62. A mismatch indicates that a 10-bit pseudo random binary pattern has become altered during transmission through the circuit under test 20. Corrective action may be taken on each error detection or statistics of false conditions may be logged and corrective action taken when the number of false conditions exceeds an acceptable predetermined number.

The invention thus provides a simple and economical circuit and method of verifying the integrity of a transmission path. Since the circuit uses only digital logic circuitry, it may be readily implemented as an integrated circuit either on its own or as a portion of another integrated circuit. In addition, the circuit may be driven by the same clock signal source as that of the circuit under test thus providing real life test conditions.

Numerous other modifications, variations and adaptations may be made to the particular embodiment of the invention described above without departing from the scope of the claims.

What I claim is:

1. A method of testing a circuit comprising a plurality of transmission paths having x input terminals for receiving a series of input test patterns and having corresponding y output terminals, the method comprising the steps of:

generating a first series of $2^n$ pseudo random input test patterns, each pattern having n bits;

applying to the x input terminals at least a portion of each of the generated input test patterns for transmission to the corresponding y output terminals;

generating a second series of patterns by beginning the second series with an n-bit seed value corresponding to an output pattern from the output terminals, each pattern in the second series formed of a plurality of bits, the second series corresponding to the first series of pseudo random input test patterns; and comparing each pattern in the second series with a corresponding output pattern from the series of output patterns.

2. A method of testing a circuit as defined in claim 1 wherein the seed value is attained by capturing from n sequential test patterns the same position bit provided at one of the y output terminals.

3. A method of testing a circuit comprising a plurality of transmission paths having x input terminals for receiving a series of input test patterns and having corresponding output terminals, the method comprising the steps of:

in a first generator for connection to the input terminals, generating a first series of $2^n$ pseudo random test patterns, each pattern having n bits;

applying to the x input terminals at least a portion of each of the generated first series of patterns for transmission to the corresponding output terminals;

in a second pseudo random test pattern generator at the output of the circuit, generating a second series of patterns by beginning the second series with an n bit seed value corresponding to the nth test pattern generated by the first generator whereby the test patterns subsequently generated by the second generator correspond to the pseudo random test patterns generated by the first generator and are in synchronism with the test patterns on the output terminals; and comparing each of the test patterns on the output terminals of the circuit with the corresponding test pattern from the second generator and generating a signal indicative of the result of the comparison.

4. A method of testing as defined in claim 3 wherein the seed value is obtained by capturing from n sequential test patterns the same position bit provided at one of the output terminals into a register of the second generator.

5. A method of testing as defined in claim 4 wherein the circuit under test and the first and second test pattern generators are driven with the same clock signal.

6. A method of testing a transmission path comprising the steps of:

generating a first series of test patterns;

applying the test patterns to an input port of the transmission path;

from the data appearing at an output port of the transmission path, replicating one of the test patterns of the first series of test patterns thereby synchronizing to a test pattern at the output port;

after synchronizing, continuing to replicate the series of test patterns applied to the input terminal thereby generating a second series of test patterns, independent of the data at the output port;

comparing the second series of test patterns with the data appearing at the output port of the transmission path; and generating a flag signal when a mismatch is detected between the second series of test patterns and th test patterns at the output port of the transmission path.

7. A circuit for testing transmission paths comprising:

(a) means for generating a first periodic series of $2^n$ pseudo random input test patterns, each pattern having n-bits for transmission through the transmission paths;

(b) means for generating a second periodic series of $2^n$ patterns, the second series corresponding to the first generated series, wherein the second series is generated after the second series generation means is provided with an n-bit starting seed value corresponding to an output pattern transmitted through the transmission paths; the provision of the seed value corresponding to a synchronizing mode; the subsequent generation of the second series corresponding to a free-running mode;

(c) control means for selectively switching the means for generating the second series from the synchronizing mode to the free running mode; and (d) comparator means for comparing each pattern in the second series with a corresponding output pattern from a series of output patterns transmitted through the transmission paths for determining the integrity of a data transmission.

8. The circuit for testing as claimed in claim 7 further comprising selection means for selectably connecting the transmission paths with a set of pseudo random input signals corresponding to a test mode or a set of normal input signals corresponding to a non-test mode.

9. A circuit as defined in claim 7 wherein the transmission paths and the circuit for testing the transmission paths are co-located on the same integrated circuit.

10. A circuit for testing a module comprising:

(a) first means for generating a first series of pseudo random input test signals for transmission through the module;

(b) second means for generating a second series of pseudo random input test signals corresponding to the first series, wherein the second series is based upon a seed value generated by the first means after having been transmitted through the module; and (c) comparator means for comparing the transmitted first series of pseudo random test signals with the second series of pseudo random test signals.

11. A circuit for verifying the integrity of a plurality of transmission paths having input terminals and corresponding output terminals, comprising:

a first circuit means for generating a first series of $2^n$ pseudo random test patterns, each pattern having n bits;

means for applying to the input terminals at least a portion of each of the generated first series of test patterns for transmission to the corresponding output terminals;

a second circuit means for generating a second series of pseudo random test patterns, the second circuit means being responsive to an n bit seed value corresponding to the nth test pattern generated by the first circuit means for synchronizing to the test patterns on the output terminals and being responsive to the seed value and to control signals for subsequently generating test patterns corresponding to the test patterns generated by the first circuit means;

means for comparing the test patterns generated by the second circuit means to the test patterns on the output terminals; and means for generating a signal indicative of the result of the comparison.

12. A circuit as defined in claim 11 wherein each of the first and second circuit means comprises a linear feedback shift register having a shift register and an exclusive-or gate responsive to the content of two of the bit positions of the shift register to generate a feedback signal, and a feedback path to recirculate the feedback signal to the most significant bit position of th register.

13. A circuit as defined in claim 12 wherein the feedback path of the second circuit means comprises a selection switch responsive to control signals for selectively feeding back the associated feedback signal or at least a portion of the signal at an output terminal of the transmission paths to thereby acquire the seed value.

14. A circuit as defined in claim 13 wherein all the elements of the circuit are driven by the same clock signal source as that normally driving the transmission paths under test.

15. A circuit as defined in claim 11 and further comprising a first switch responsive to control signals for selectively switching the input terminals of the transmission paths from the normal sources of signals to the output port of the first circuit means.

* * * * *